United States Patent
Abrams et al.

(10) Patent No.: US 8,438,541 B2
(45) Date of Patent: May 7, 2013

(54) SOFTWARE CHANGE MANAGEMENT EXTENSION FOR UNIFORMLY HANDLING ARTIFACTS WITH RELAXED CONTRAINTS

(75) Inventors: Steven R. Abrams, New City, NY (US); Jean-Michel Lemieux, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 12/815,623

(22) Filed: Jun. 15, 2010

(65) Prior Publication Data
US 2011/0307862 A1    Dec. 15, 2011

(51) Int. Cl.
*G06F 9/44* (2006.01)
(52) U.S. Cl.
USPC .......................... 717/120; 717/121; 717/122
(58) Field of Classification Search .................. None
See application file for complete search history.

(56) References Cited

U.S. PATENT DOCUMENTS

| | | | |
|---|---|---|---|
| 4,558,413 A * | 12/1985 | Schmidt et al. | 717/170 |
| 7,039,648 B2 | 5/2006 | David | |
| 7,322,024 B2 | 1/2008 | Carlson et al. | |
| 7,698,323 B1 * | 4/2010 | Rangan et al. | 707/695 |
| 2002/0152221 A1 | 10/2002 | Kauffman et al. | |
| 2003/0046282 A1 * | 3/2003 | Carlson et al. | 707/6 |
| 2005/0050155 A1 * | 3/2005 | McGee et al. | 709/213 |
| 2006/0026567 A1 * | 2/2006 | McVoy et al. | 717/120 |
| 2006/0206890 A1 | 9/2006 | Shenfield et al. | |
| 2007/0169103 A1 | 7/2007 | Bhatkhande et al. | |
| 2008/0046858 A1 | 2/2008 | McClean et al. | |
| 2008/0109801 A1 | 5/2008 | Levine et al. | |
| 2008/0181516 A1 | 7/2008 | Jackson | |
| 2008/0201700 A1 * | 8/2008 | Quinn et al. | 717/168 |
| 2008/0307393 A1 * | 12/2008 | Cartledge et al. | 717/120 |
| 2009/0144703 A1 * | 6/2009 | Vairavan et al. | 717/122 |
| 2009/0271777 A1 | 10/2009 | Tow et al. | |
| 2011/0161931 A1 * | 6/2011 | Camelon et al. | 717/121 |

OTHER PUBLICATIONS

IBM Rational Asset Manager V7.1 Enhances Collaboration Across Development Teams While Accelerating Application and Service Delivery, IBM United States Announcement, 208-160, Jun. 24, 2008, pp. 1-10. Retrieved from the Internet<http://www-01.ibm.com/common/ssi/rep_ca/0/897/ENUS208-160/ENUS208160.PDF>.*

(Continued)

*Primary Examiner* — Thuy Dao
*Assistant Examiner* — Stephen Berman
(74) *Attorney, Agent, or Firm* — Patents on Demand P.A.; Brian K. Buchheit; Scott M. Garrett

(57) ABSTRACT

Software change management (SCM) systems can be extended to uniformly handle artifacts which lack constraints typically imposed on managed items. In the solution, a data type associated with a SCM system can enable management of unmanaged artifacts. Unmanaged artifacts can include, but is not limited to, artifacts which lack can traditional change management constraints, managed artifacts not directly associated with the SCM, artifacts with different constraints than the SCM imposed constraints, and the like. In one embodiment, an unmanaged artifact can have different lifecycles, policies, and the like which can make it unsuitable for traditional management approaches by the SCM. The SCM can utilize the data type to manage unmanaged artifacts without requiring significant change in functionality of the SCM by permitting change management processes to be applied to the unmanaged artifacts.

19 Claims, 3 Drawing Sheets

OTHER PUBLICATIONS

IBM Rational Asset Manager, 2007, IBM Corporation, pp. 1-7. Retrieved from the Internet<ftp://public.dhe.ibm.com/software/rational/web/datasheets/ram.pdf>.*

IBM Rational Team Concert, Sep. 1, 2012, pp. 1-4. Retrieved from the Internet<http://en.wikipedia.org/wiki/IBM_Rational_Team_Concert>.*

IBM Rational Asset Manager V7.1 Enhances Collaboration Across Development Teams While Accelerating Application and Service Delivery, IBM United States Announcement, 208-160, Jun. 24, 2008, pp. 1-10. Retrieved from the Internet<http://www-01.ibm.com/common/ssi/rep_ca/0/897/ENUS208-160/ENUS208160.Pdf>.*

IBM Rational Asset Manager, 2007, IBM Corporation, pp. 1-8. Retrieved from the Internet<ftp://public.dhe.ibm.com/software/rational/web/datasheets/ram.pdf>.*

IBM Rational Team Concert, Nov. 9, 2012, pp. 1-4. Retrieved from the Internet<http://en.wikipedia.org/wiki/IBM_Rational_Team_Concert>.*

* cited by examiner

SOFTWARE CHANGE MANAGEMENT EXTENSION FOR UNIFORMLY HANDLING ARTIFACTS WITH RELAXED CONTRAINTS

BACKGROUND

The present disclosure relates to the field of software change management, and more particularly to extending the software change management to uniformly handle artifacts which lack constraints typically imposed on managed items.

Teams of software developers can collaborate on a set of artifacts, typically referred to as "source code". They can actively make changes to these artifacts regularly, sharing the changes with each other. Typically, software configuration management (SCM) systems can be utilized to manage these set of artifacts. These systems can help developers in many ways such as tracking the revision history of these artifacts, ensuring that developers have access to appropriate configurations of these artifacts, making developers aware of changes made by others on their team to other source artifacts, helping them obtain these changes in their work environment.

Developers can require access to externally managed artifacts that are not under their own active development. These artifacts can include third party libraries, binaries created by other development teams, companies, etc. These artifacts may be under configuration management in a separate SCM system having different rules and policies from the one the developers are using, which can be problematic. This situation often arises for team developed software where team members are employed by more than one company, each having their own standards. It is difficult and can be impractical to maintain synchronization between SCM databases and files used by the different companies. This can be problematic for all team members involved, especially when software builds even during development are generated from SCM managed items.

Additionally, some artifacts are not appropriate for management in the SCM system as their lifecycles, access rules, and management policies can be different from source code. As such, developers cannot take advantage of the SCM management features provided to developers for artifacts not under their own active development. Developers, however, need easy access to appropriate versions of these artifacts for the configuration of source code on which they are developing.

Often separate libraries and/or repositories can be maintained for these externally managed artifacts. However, there can be no easy way to know which version of these artifacts is appropriate for a given configuration of the source code. Further, developers need to be aware of this external system. Frequently the means for gathering externally managed artifacts into their work environment is distinct from the means for gathering their source code artifacts. The result is often confusion (classloading process problems, for example) about where to get the right versions, bugs in the software due to version mismatches, and reduced developer productivity.

Additionally, these artifacts can frequently need to be provisioned into specific locations in the developers' environments. Often, developers are not experts in the intricacies of the build process and the required locations of these other artifacts and as such are forced to perform manual provisioning. Manual provisioning can be a time-consuming and error-prone process which can negatively impact developer productivity. Thus it would be beneficial to alleviate the burden of manual provisioning enabling developers to be more efficient.

SUMMARY

One aspect of the disclosure is a method, computer program product, and system for extending the software change management to handle unmanaged artifacts. An object within a software change management (SCM) system can be stored. The object can be managed as a traditional managed artifact, such as a source code entity. The object can be comprised of one or more unmanaged artifacts. The unmanaged artifacts lack restrictions imposed by the software change management system. The restrictions can include, but are not limited to, a lifecycle, access rule, and a management policy. The unmanaged artifacts can be associated with a binding of the traditional managed artifact, which can be a compile-time dependency binding. The unmanaged artifacts can be associated with a remote repository where the unmanaged artifacts are managed as another traditional managed artifact. A programmatic action can be triggered on the object in response to a provisioning action associated with the traditional managed artifact or the object. The provisioning action can be a revision control management action.

Another aspect of the disclosure is a system, method, and computer program product for extending the software change management to handle unmanaged artifacts. The system can comprise of an object comprising of a reference stored within a software change management (SCM) system. The reference can be a linkage to a remote managed artifact stored within a repository, wherein the reference lacks artifact restrictions, such as traditional software change management artifact restrictions associated with a managed artifact within the SCM. The managed artifact can be a source code entity. The object can be associated with a binding to the managed artifact stored within the SCM. The system can include an SCM engine able to perform operations on the object in a manner consistent with a managed artifact. Further, the system can comprise a portion of metadata associated with the object. The metadata can comprise a name information and a location information associated with the remote managed artifact.

DETAILED DESCRIPTION

Figure 1:
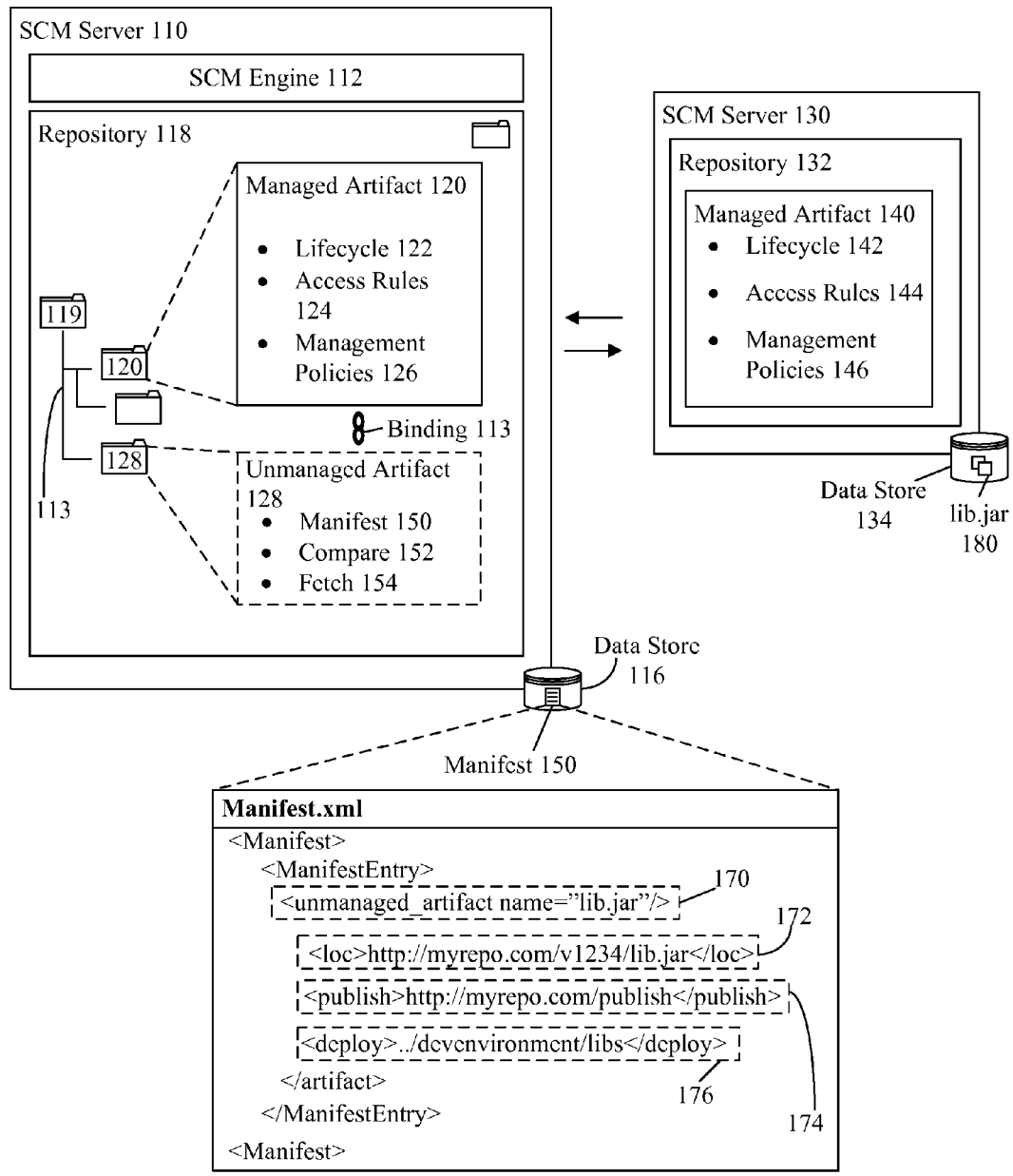
FIG. 1 is a schematic diagram illustrating a system for extending the software change management (SCM) to uniformly handle artifacts which lack constraints typically imposed on managed items in accordance with an embodiment of inventive arrangements disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The present disclosure provides a solution for extending the software change management (SCM) to uniformly handle artifacts which lack constraints typically imposed on managed items. For example, the artifacts may be located in a remote repository and not within a preferred SCM repository. The artifacts may also be incompatible, for one reason or another, with policies imposed by the SCM system. In the solution, a data type associated with a software change management (SCM) system can enable management of unmanaged artifacts. Unmanaged artifacts can include, but is not limited to, artifacts which lack can traditional change management constraints. In other words unmanaged artifacts have intentionally relaxed constraints. One such relaxed constraint can be a location at which the artifact is stored, as the unmanaged artifact can specify an external link (e.g., URL) for a corresponding file. Additionally, an unmanaged artifact can have different lifecycles, policies, and the like which can make it unsuitable for traditional management approaches by the SCM. In one embodiment, the SCM can utilize the data type to manage unmanaged artifacts without requiring significant change in functionality of the SCM by permitting change management processes to be applied to the unmanaged artifacts.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a schematic diagram illustrating a system 100 for extending the software change management (SCM) to uniformly handle artifacts (referred to as unmanaged artifacts) which lack constraints typically imposed on managed items in accordance with an embodiment of inventive arrangements disclosed herein. In system 100, an unmanaged artifact (UA) 128 data type having customizable constraints can enable an SCM server 110 to control managed items in tandem. One such customizable constraint can permit an unmanaged artifact (UA) 128

Managed items can include, but is not limited to, managed artifact 120 and managed artifact 140. Although, managed artifact 120, 140 can differ in constraints including, but not limited to, baselines, location, accessibility, lifecycle 122, 142, access rules 124, 144, management policies 126, 146, and the like, UA 128 data type can be used to transparently unify management of the managed items.

Change management unification can be achieved through manifest 150 associated with the UA 128. Manifest 150 can include constraints 170-176 which can be selectively established depending on requirements of the artifact to be change managed. In one embodiment, manifest 150 can comprise of a name constraint and a location constraint associated with a managed artifact 140. In the embodiment, the name (e.g., name 170) and location constraints (e.g., location 172) can be used to permit identification and location of a managed artifact 140 within SCM server 130. For example, manifest 150 associated with data store 116 can be used to couple a JAVA 2 ENTERPRISE EDITION archive file (e.g., lib.jar 180) associated with data store 134 of a SCM server 130 to managed artifact 120.

Unmanaged artifact (UA) 128 can include, but is not limited to, compile-time binary data, directories and/or files, documentation, wikis, and the like. In one instance, UA 128 can be associated with one or more portions of artifact 140 including, but not limited to, a source code trunk, branch, merge, and the like. In one configuration, UA 128 can be bound to managed artifact 120 via binding 113. For example, binding 113 can be a compile-time binding such as a dependency binding between source code (e.g., artifact 120) and third-party libraries (e.g., managed artifact 140). Binding 113 can include one or more constraints associated with a software development process including, but not limited to, compile-time bindings, development-time bindings, change management constraints (e.g., sign-offs), and the like.

In one instance, UA 128 can lack constraints including, but not limited to, lifecycle 122, access rules 124, and management policies 126 commonly associated with repository 118. That is, UA 128 can be unrestricted by rigorous SCM limitations (e.g., change status accounting) which can often burden development time management of artifacts 140.

In one embodiment, UA 128 can be a linkage used to couple managed artifact 120 with a managed artifact 140 for purposes of change management. In one instance, the coupling can be a loose coupling enabling minimal constraints (e.g., name, location, etc) to be placed on UA 128. In another instance, the coupling can be tight, permitting rigid constraints to be applied to UA 128. For example, coupling can include defect tracking parameters which can be used to automatically determine when specific functionality of artifact 140 is broken.

In one configuration, coupling can be achieved through metadata information associated with UA 128. In the configuration, an Extensible Markup Language (XML) file can be used (e.g., manifest.xml) to maintain coupling information. For instance, elements 170-176 of manifest 150 can establish operational parameters for coupling. That is, for each change management activity, constraints can be selectively enabled or unenabled for UA 128.

Since artifact 120, 140 can be coupled utilizing UA 128, existing build management processes can be performed on UA 128 without requiring significant changes to the established processes. In one embodiment, automated version tracking can be performed on UA 128 to enable traditional build-time dependency problems to be resolved. For example, by examining UA 128 metadata (e.g., manifest 150) engine 112 can automatically determine the most appropriate build of artifact 140 to utilize during compile-time of artifact 120.

As used herein, software change management can refer to tracking and controlling changes of a software entity 119. Software entity 119 can include, but is not limited to, source code entity, documentation, design models, and the like. For example, artifact 120, 140 can be a source code entity such as a source code project. In one instance, artifact 120 can depend on one or more inputs and/or outputs associated with artifact 140. In the instance, SCM server 110 can utilize manifest 150 to virtually manage artifact 140 based on specified inputs/outputs within the manifest 150. For example, when a change is performed on artifact 140, the change can be automatically propagated to each artifact within entity 119 (e.g., managed artifact 120) dependent on artifact 140. In this way, change management processes can automatically respond to changes of artifact 140.

Software change management server 110 can be a hardware/software entity for permitting uniform handling of managed artifact 120 and managed artifact 140. SCM 110 can comprise of, but is not limited to, SCM engine 112, data store 116, repository 118, and the like. SCM server 110 can be communicatively linked to one or more SCM servers 130. In one instance, SCM server 110 can be an IBM RATIONAL CLEARCASE server. Server 110 can enable user transparent automated synchronization of managed artifacts 140 with managed artifacts 120. In one instance, when artifact 140 changes, changes can be propagated via one or more operations 152, 154 being performed. That is, utilizing manifest 150, compare 152, and fetch 154, server 110 can automatically maintain consistency between changes of artifact 140 and changes within managed artifact 120.

SCM engine 112 can be one or more hardware/software components enabling management of unmanaged artifact 128 and associated constraints 170-176. In one embodiment, change management actions performed on managed artifacts 120 can be automatically performed on unmanaged artifacts 128. For example, when a check-out of managed artifact 120 is performed, provisioning of artifact 120 and unmanaged artifact 128 can be enacted. Engine 112 can change manage UA 128 via manifest 150 which can be automatically maintained by the engine 112. That is, manifest 150 can be used to maintain an illusion of uniform artifact management without requiring specialized configurations to be applied to artifact 120, 128, 140.

Repository 118 can be a hardware/software component permitting the tracking, controlling, and/or storing of software entity 119. Repository 118 can comprise, but is not limited to, binding 113, software entity 119, managed artifact 120, UA 128, and the like. Repository 118 can store UA 128 within software entity 119. Unmanaged artifact (UA) 128 can be automatically and/or manually created based on artifact requirements associated with software entity 119. In one configuration, engine 112 can automatically determine artifacts dependent on artifact 120 and programmatically establish appropriate UA 128 entries within repository 118. In one instance, repository 118 can be a source code repository associated with an IBM RATIONAL TEAM CONCERT development environment.

In one instance, UA 128 can be associated with a compare 152 and a fetch 154 operations. Operations 152, 154 can permit development time and/or build-time synchronization and change management of artifacts 140. In one instance, operations 152, 154 can be performed during creation, update and/or provisioning of a development environment. In another instance, operations 152, 154 can be performed during intervals as a "background process". For example, UA 128 can be continually updated to reflect the most appropriate revision of artifact 140 for which artifact 120 depends.

In one instance, functionality can be performed in real-time or near real-time, enabling developers real-time management of UA 128. Operations 152, 154 can be customized using one or more settings including, but not limited to, change management settings associated with server 110, change management configurations associated with server 130, local environment change management variables, and the like.

In one embodiment, operations 152, 154 associated with UA 128 can be triggered off of manifest 150 artifact. Manifest 150 can conform to, but is not limited, markup language file, text file, database tables, and the like. In one instance, manifest 150 can be a configuration file associated with change configuration information of managed artifact 120 and/or UA 128. In the instance, manifest 150 can specify constraints, including, but not limited to, artifact name, artifact location, artifact revision, publishing information, deployment information, and the like. For example, manifest 150 can specify a directory 176 in which to deploy artifacts 140 within a development environment during provisioning. In one configuration, element 172, 174 can specify the information associated with an artifact via a, Uniform Resource Identifier (URI), Uniform Resource Locator (URL), and the like.

One configuration of system 100 can include a unified manifest 150 which can be established for every managed artifact within a software entity 119. That is, a master manifest entity can be used to manage managed artifacts associated with SCM server 110. In another configuration of system 100, each managed artifact can be associated with a manifest 150. For example, managed artifact 120 can include a private manifest which can be accessible only to authorized users, software, and/or services.

To simplify the creation and maintenance of manifest 150, engine 112 can automatically manage manifest 150. When changes to the artifact 120 are delivered, engine 112 can optionally engage a publish mechanism. This mechanism can analyze manifest 150 and POST appropriate versions to the location (e.g., URLs) specified in the publish 174 (e.g., <publish>) elements. The POST operation can result in a new URL for the appropriate version of the artifact, and the publish mechanism can modify manifest 150 elements (e.g., location element 172) to refer to published location. The SCM system can deliver the changes to the manifest 150 when the POST operation is completed.

Drawings presented herein are for illustrative purposes only and should not be construed to limit the invention in any regard. Functionality expressed in system 100 can be encapsulated within one or more change management workflows to enable automated change management of externally managed artifacts 140 to be achieved. Further, functionality expressed in system 100 can be implemented in one or more existing frameworks including, but not limited to, IBM JAZZ. System 100 can be associated with one or more software including, but not limited to, IBM TIVOLI ASSET MANAGER, IBM RATIONAL INTEGRATION DEVELOPER, IBM WEBSPHERE, and the like.

Figure 2:
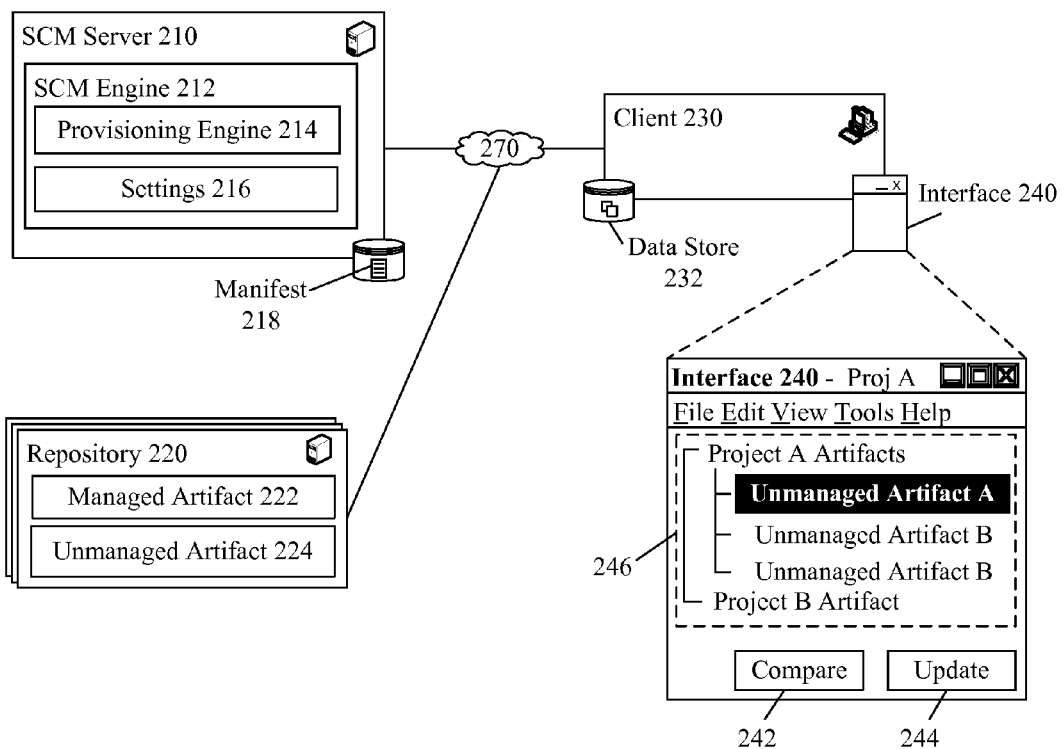
FIG. 2 is a schematic diagram illustrating a system for extending the software change management (SCM) to uniformly handle artifacts which lack constraints typically imposed on managed items in accordance with an embodiment of inventive arrangements disclosed herein.

FIG. 2 is a schematic diagram illustrating a system 200 for extending the software change management (SCM) to uniformly handle artifacts which lack constraints typically imposed on managed items in accordance with an embodiment of inventive arrangements disclosed herein. In system 200, a SCM server 210 can enable automated provisioning of artifact 222, 224 to development environments and/or client 230. In system 200, server 210, 220, client 230 can be communicatively linked via network 270. Interface 240 can permit change management of unmanaged artifact 224 in tandem with artifact 222. For instance, interface 240 can permit manual control of provisioning of artifacts 224.

In one configuration of system 200, SCM server 210 can be a network element comprising of SCM engine 212. In another configuration, SCM server 210 can be a distributed computing platform comprising of one or more SCM engines 212.

Engine 212 can respond to change management actions affecting managed artifact 222 and unmanaged artifact 224. Further, change management actions associated with client 230 can trigger engine 212 functionality to be engaged. For instance, when change management Engine 212 can comprise of provisioning engine 214 and settings 216. Engine 212 can include traditional software change management functionality including, but not limited to, configuration identification, configuration control, configuration status accounting, configuration auditing, build management, process management, environment, teamwork configuration management, defect tracking, and the like. That is, traditional SCM functionality can be associated with unmanaged artifact 224. In one embodiment, engine 212 functionality can be accessed via a Web-enabled service.

Engine 214 can respond to repository 220 and/or interface 240 events and perform appropriate provisioning operations. Engine 214 functionality can include, but is not limited to, fetch, compare, tracking, and the like. In one instance, a compare operation can compare an unmanaged artifact 224 revision in a development environment with a revision specified in the manifest 218 to determine which unmanaged artifact 224 requires updating. In another instance, a fetch mechanism can be used to obtain specific revisions of unmanaged artifacts 224 from one or more repositories 220. That is, engine 214 can enable user transparent change management for a unmanaged artifact 224.

Settings 216 can enable customized configuration of engine 214 allowing engine 214 to perform any traditional operations of change management in a implementation specific manner. That is, settings 216 can be used to accommodate change management policies such as developmental policies, corporate policies, and the like. For instance, settings 216 can be used to provide support for utilizing third-party dependency source and provisioning agents. In one instance, settings 216 can be used to tailor compare and fetch operations. For instance, settings 216 can be a ruleset for conflict resolution of a compare, fetch, and/or provisioning action.

Interface 240 can permit user initiated change management actions to be performed on artifact 224. Interface 240 can be associated with a client 230 and/or SCM server 210. Interface 240 can be one or more screens of an integrated development environment (IDE) editor, Web-based interface, and the like. For instance, interface 240 can be a component of IBM ECLIPSE IDE software. Interface 240 can be a graphical user interface, voice user interface, multi-modal interface, and the like. Interface 240 can comprise of, but is not limited to, interface elements 242-246 which can enable user controlled change management for unmanaged artifact 224. In one instance, interface 240 can be automatically presented during a build process workflow. In another instance, interface 240 can be manually accessed prior to or subsequent to a build process workflow. For example, interface 240 can be presented within a sidebar of an IDE when a user provisioning action is performed.

Element 246 can be used to provide information associated with an unmanaged artifact 224. In one embodiment, element 246 can present a structured view of unmanaged artifacts 224. In the embodiment, relationship information between managed artifacts 222 and unmanaged artifacts 224 can be presented indicating dependencies, revisions, and the like. Relationship information can include change management configurations, versioning information, and the like.

Elements 242, 244 can permit interaction with one or more selected unmanaged artifacts presented within element 246. Element 242, 244 can be user interactive elements including, but not limited to, interactive buttons, checkboxes, context menu entries, and the like. In one instance, element 242 can be used to compare one or more configurations of unmanaged artifact 224 (e.g., Unmanaged artifact A) associated with repository 220 with artifacts within the local client 230 environment (e.g., data store 232). In another instance, element 244 can be used to fetch one or more configurations of unmanaged artifacts 224 and provision the artifacts appropriately within client 230.

Drawings presented herein are for illustrative purposes only and should not be construed to limit the invention in any regard. It should be appreciated that user interactions with interface 240 can be a portion of a workflow where one or more screens can be presented to permit customized provisioning and/or control of unmanaged artifacts 224.

Figure 3:
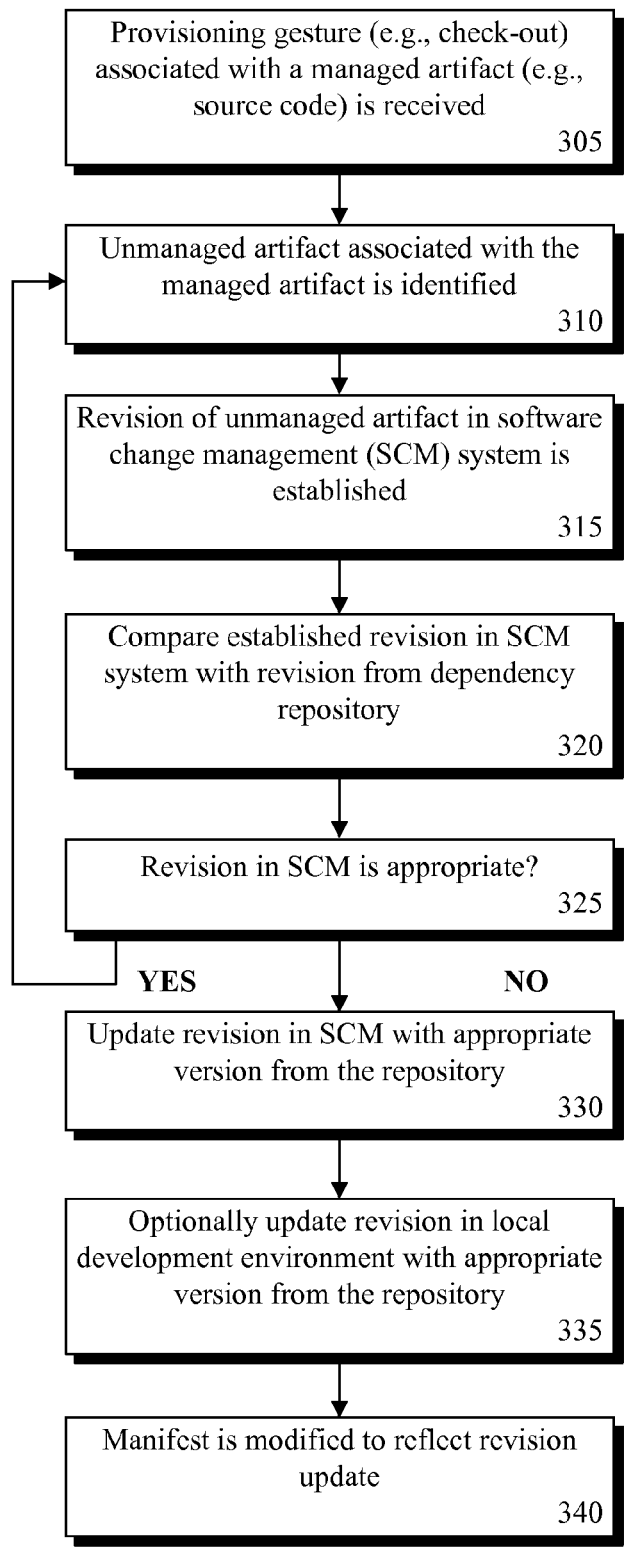
FIG. 3 is a flowchart illustrating a method for extending the software change management (SCM) to uniformly handle artifacts which lack constraints typically imposed on managed items in accordance with an embodiment of inventive arrangements disclosed herein.

FIG. 3 is a flowchart illustrating a method 300 for extending the software change management (SCM) to uniformly handle artifacts which lack constraints typically imposed on managed items in accordance with an embodiment of inventive arrangements disclosed herein. Method 300 can be performed within the context of system 100, 200. In method 300, an unmanaged artifact associated with a managed artifact (e.g., source code) can be automatically change managed during provisioning. As used herein, the unmanaged artifact and managed artifact can be associated with an software change management (SCM) system.

In step 305, a provisioning gesture associated with a managed artifact can be received by an SCM. In step 310, an unmanaged artifact associated with the managed artifact can be identified. In step 315, managed artifact revision associated with the unmanaged artifact can be identified. In step 320, the unmanaged artifact revision in the SCM can be compared with a revision from a dependency repository. Dependency repository can include, but is not limited to, source code repository, federated repositories, and the like. In step 325, if the revision of the unmanaged artifact in the SCM is appropriate, the method can return to step 310, else continue to step 330. In step 330, the unmanaged artifact revision can be updated with the appropriate version. In one instance, step 330 can include, storing appropriate revisions within a data store local to the SCM. In step 335, a manifest associated with the unmanaged artifact can be modified to reflect the revision update.

Drawings presented herein are for illustrative purposes only and should not be construed to limit the invention in any regard. It should be appreciated that method 300 can be performed continuously within a system 100, 200 to enable a real-time synchronized development environment to exist.

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for extending software change management to handle unmanaged artifacts comprising:
   one or more processors, which are hardware processors;
   one or more non-transitory storage mediums storing digitally encoded information;
   an object comprising of a reference stored within a software change management (SCM) system, comprising the one or more processors and the one or more non-transitory storage mediums, wherein the reference is a linkage to a remote managed artifact stored within a repository, wherein the at least one reference lacks artifact restrictions, wherein the artifact restrictions are traditional software change management artifact restrictions associated with a managed artifact within the SCM, wherein the object is associated with a binding to the managed artifact stored within the SCM; and
   an SCM engine able to perform operations on the object in a manner consistent with a managed artifact; and
   a portion of metadata associated with the object, wherein the metadata comprises of at least a name information and a location information associated with the remote managed artifact, wherein the location information is a Uniform Resource Identifier (URI), wherein the URI is associated with a source code repository.

2. The system of claim 1, wherein the operations are at least one of a fetch operation and a compare operation.

3. The system of claim 1, wherein the managed artifact is a source code entity, and wherein the portion of metadata is stored within an extensible markup (XML) language file within the SCM, wherein the portion of metadata indicates a means to access the remote managed artifact.

4. The system of claim 1, wherein the system is a portion of a Web-enabled service.

5. The system of claim 1, wherein the SCM performs a dependency check on each unmanaged artifact associated with the object.

6. The system of claim 1, wherein the object comprises of at least one remote managed artifact.

7. The system of claim 1, wherein the SCM is an IBM RATIONAL ASSET MANAGER software.

8. A computer program product comprising a non-transitory computer readable storage medium having computer usable program code embodied therewith, the computer usable program code comprising:
   computer usable program code stored in a non-transitory tangible storage medium, when said computer usable program code is executed by a processor it is operable to store an object within a software change management (SCM) system, wherein the object is managed as a traditional SCM artifact, wherein the object comprises a reference to one or more unmanaged artifacts, wherein the unmanaged artifacts lack restrictions imposed by the software change management system, wherein the unmanaged artifacts are associated with a binding of the traditional SCM managed artifact, wherein the object has associated metadata, wherein the metadata comprises of at least a name information and a location information associated with one of the unmanaged artifacts, which is a remote managed artifact, wherein the location information is a Uniform Resource Identifier (URI), wherein the URI is associated with a source code repository; and computer usable program code stored in a non-transitory tangible storage medium, when said computer usable program code is executed by a processor it is operable to trigger a programmatic action on the stored object in response to an action associated with at least one of the traditional SCM artifact and the stored object.

9. The computer program product of claim 8, wherein the traditional SCM artifact is a source code entity, wherein the restrictions that the unmanaged artifacts lack are at least one of a lifecycle, access rule, and a management policy, wherein the binding is a compile time dependency binding, wherein the unmanaged artifacts is associated with a remote repository, wherein within the remote repository, the unmanaged artifacts are managed as another traditional SCM artifact, and wherein the action that triggers the programmatic action is a provisioning action.

10. The computer program product of claim 9, wherein the provisioning action results in importing at least one unmanaged artifact into a development environment associated with a client computing device.

11. The computer program product of claim 8, wherein the programmatic action is performed prior to or subsequent to compile time.

12. The computer system of claim 1, wherein the object is associated with at least one of a source code trunk, a source code branch, and a source code merge of the remote managed artifact.

13. The system of claim 1, wherein the object comprises a linkage, the linkage coupling a managed artifact stored within the SCM to the remote managed artifact.

14. The system of claim 13, wherein the coupling is one of a loose coupling and tight coupling, wherein the loose coupling enables minimal constraints on the object and wherein the tight coupling enables rigid constraints on the object.

15. The system of claim 1, wherein the SCM engine is configured to:

determine automatically one or more managed artifacts dependent on a traditional managed artifact; and create the object within the SCM system based on the dependency.

16. The computer program product of claim 8, wherein the object is associated with at least one of a source code trunk, a source code branch, and a source code merge of the remote managed artifact.

17. The computer program product of claim 8, wherein the object comprises a linkage, the linkage coupling a managed artifact stored within the SCM to the remote managed artifact.

18. The computer program product of claim 8, wherein the coupling is one of a loose coupling and tight coupling, wherein the loose coupling enables minimal constraints on the object and wherein the tight coupling enables rigid constraints on the object.

19. The computer program product of claim 8, wherein the SCM engine is configured to:

determine automatically one or more managed artifacts dependent on a traditional managed artifact; and create the object within the SCM system based on the dependency.

* * * * *